(12) United States Patent
Sippel et al.

(10) Patent No.: US 10,371,008 B2
(45) Date of Patent: Aug. 6, 2019

(54) TURBINE SHROUD

(71) Applicants: Rolls-Royce Corporation, Indianapolis, IN (US); Rolls-Royce North American Technologies, Inc., Indianapolis, IN (US)

(72) Inventors: Aaron D. Sippel, Zionsville, IN (US); Bruce E. Varney, Greenwood, IN (US); Ted J. Freeman, Danville, IN (US); Jeffrey A. Walston, Indianapolis, IN (US); Jun Shi, Carmel, IN (US)

(73) Assignees: Rolls-Royce North American Technologies Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 824 days.

(21) Appl. No.: 14/972,444

(22) Filed: Dec. 17, 2015

(65) Prior Publication Data
US 2016/0177786 A1    Jun. 23, 2016

Related U.S. Application Data

(60) Provisional application No. 62/096,050, filed on Dec. 23, 2014.

(51) Int. Cl.
*F01D 25/24*     (2006.01)
*F01D 25/00*     (2006.01)
(Continued)

(52) U.S. Cl.
CPC .............. *F01D 25/24* (2013.01); *F01D 5/284* (2013.01); *F01D 11/08* (2013.01); *F01D 11/12* (2013.01);
(Continued)

(58) Field of Classification Search
CPC .......... F01D 5/284; F01D 11/08; F01D 11/12; F01D 11/122; F01D 25/005; F01D 25/24; F01D 25/246; Y02T 50/672
See application file for complete search history.

(56) References Cited

U.S. PATENT DOCUMENTS

| 3,601,414 A | 8/1971 | Rao |
| 4,087,199 A | 5/1978 | Hemsworth et al. |

(Continued)

FOREIGN PATENT DOCUMENTS

| DE | 102008044450 A1 | 2/2009 |
| EP | 1965030 A2 | 9/2008 |

(Continued)

OTHER PUBLICATIONS

Corman, Gregory S. and Luthra, Krishan L.; Melt Infiltrated Ceramic Composites (HIPERCOMP®) for Gas Turbine Engine Applications; DOE/CE/41000-3; May 1994-Sep. 2005; pp. 1-507.

(Continued)

*Primary Examiner* — Igor Kershteyn
(74) *Attorney, Agent, or Firm* — Barnes & Thornburg LLP

(57) ABSTRACT

A turbine shroud for a gas turbine engine includes an annular metallic carrier and a ceramic-containing blade track. A connection is formed between the annular metallic carrier and the ceramic-containing blade track by insert pins extending through metallic carrier into the ceramic-containing blade track.

20 Claims, 6 Drawing Sheets

(51) Int. Cl.
  *F01D 5/28* (2006.01)
  *F01D 11/08* (2006.01)
  *F01D 11/12* (2006.01)
(52) U.S. Cl.
  CPC .......... *F01D 11/122* (2013.01); *F01D 25/005* (2013.01); *F01D 25/246* (2013.01); *Y02T 50/672* (2013.01)

(56) References Cited

U.S. PATENT DOCUMENTS

| | | | |
|---|---|---|---|
| 4,477,086 A | 10/1984 | Feder et al. | |
| 4,646,810 A | 3/1987 | Lardellier | |
| 4,679,981 A | 7/1987 | Guibert et al. | |
| 4,863,345 A | 9/1989 | Thompson et al. | |
| 5,163,809 A | 11/1992 | Akgun et al. | |
| 5,738,490 A | 4/1998 | Pizzi | |
| 6,142,731 A | 11/2000 | Dewis et al. | |
| 6,315,519 B1 | 11/2001 | Bagepalli et al. | |
| 6,517,313 B2 | 2/2003 | Rogers | |
| 6,726,448 B2 | 4/2004 | McGrath et al. | |
| 6,733,233 B2 | 5/2004 | Jasklowski et al. | |
| 6,733,235 B2* | 5/2004 | Alford | F01D 11/08 415/173.1 |
| 6,758,386 B2 | 7/2004 | Marshall et al. | |
| 6,758,653 B2 | 7/2004 | Morrison | |
| 6,896,483 B2 | 5/2005 | Dierksmeier et al. | |
| 6,896,484 B2* | 5/2005 | Diakunchak | F01D 11/18 415/173.1 |
| 6,910,853 B2 | 6/2005 | Carman et al. | |
| 7,090,459 B2 | 8/2006 | Bhate et al. | |
| 7,195,452 B2 | 3/2007 | Allan et al. | |
| 7,217,089 B2 | 5/2007 | Durocher et al. | |
| 7,234,306 B2 | 6/2007 | Aumont et al. | |
| 7,374,396 B2 | 5/2008 | Martin et al. | |
| 7,435,049 B2 | 10/2008 | Ghasripoor et al. | |
| 7,641,442 B2 | 1/2010 | Denece et al. | |
| 7,665,960 B2 | 2/2010 | Shi et al. | |
| 7,771,160 B2 | 8/2010 | Shi et al. | |
| 7,914,256 B2 | 3/2011 | Xie et al. | |
| 7,988,395 B2 | 8/2011 | Steffier | |
| 8,047,773 B2 | 11/2011 | Bruce et al. | |
| 8,061,977 B2 | 11/2011 | Keller et al. | |
| 8,079,807 B2 | 12/2011 | Shapiro et al. | |
| 8,092,160 B2 | 1/2012 | Shi et al. | |
| 8,167,546 B2 | 5/2012 | Shi et al. | |
| 8,235,670 B2 | 8/2012 | Morrison et al. | |
| 8,257,029 B2 | 9/2012 | Habarou et al. | |
| 8,322,983 B2 | 12/2012 | Marini | |
| 8,328,505 B2 | 12/2012 | Shi et al. | |
| 8,496,431 B2 | 7/2013 | Habarou et al. | |
| 8,511,975 B2 | 8/2013 | Shi et al. | |
| 8,555,647 B2 | 10/2013 | Dimascio et al. | |
| 8,568,091 B2 | 10/2013 | McCaffrey | |
| 8,651,497 B2 | 2/2014 | Tholen et al. | |
| 8,684,689 B2 | 4/2014 | Guo et al. | |
| 8,739,547 B2 | 6/2014 | Jarmon et al. | |
| 8,740,552 B2 | 6/2014 | Marusko et al. | |
| 8,770,931 B2 | 7/2014 | Alvanos et al. | |
| 8,784,052 B2 | 7/2014 | Shi et al. | |
| 8,790,067 B2 | 7/2014 | McCaffrey et al. | |
| 8,801,372 B2 | 8/2014 | Shi et al. | |
| 8,814,173 B2 | 8/2014 | Motzkus et al. | |
| 8,834,106 B2 | 9/2014 | Luczak | |
| 8,926,270 B2 | 1/2015 | Karafillis et al. | |
| 9,011,079 B2 | 4/2015 | Coign et al. | |
| 2004/0047726 A1 | 3/2004 | Morrison | |
| 2008/0206046 A1* | 8/2008 | Razzell | F01D 11/005 415/173.1 |
| 2009/0208322 A1 | 8/2009 | McCaffrey | |
| 2010/0111678 A1 | 5/2010 | Habarou et al. | |
| 2010/0150703 A1 | 6/2010 | Gonzalez et al. | |
| 2010/0232941 A1 | 9/2010 | Smoke et al. | |
| 2011/0052384 A1 | 3/2011 | Shi et al. | |
| 2011/0057394 A1 | 3/2011 | Hailing | |
| 2011/0150635 A1 | 6/2011 | Motzkus et al. | |
| 2011/0274538 A1 | 11/2011 | Shi et al. | |
| 2011/0293410 A1* | 12/2011 | Marusko | F01D 9/04 415/173.1 |
| 2011/0318171 A1* | 12/2011 | Albers | F01D 11/125 415/173.1 |
| 2012/0070276 A1 | 3/2012 | Shi et al. | |
| 2012/0107107 A1 | 5/2012 | Chan et al. | |
| 2012/0107122 A1* | 5/2012 | Albers | F01D 11/005 416/179 |
| 2012/0156029 A1 | 6/2012 | Karafillis et al. | |
| 2012/0177488 A1 | 7/2012 | Corman | |
| 2012/0247124 A1* | 10/2012 | Shapiro | F01D 9/04 60/805 |
| 2012/0263582 A1 | 10/2012 | Foster et al. | |
| 2012/0301269 A1 | 11/2012 | Alvanos et al. | |
| 2012/0301312 A1 | 11/2012 | Berczik et al. | |
| 2012/0301303 A1 | 12/2012 | Alvanos et al. | |
| 2012/0308367 A1 | 12/2012 | Luczak | |
| 2013/0008176 A1 | 1/2013 | Shi et al. | |
| 2013/0011248 A1 | 1/2013 | Croteau et al. | |
| 2013/0156550 A1* | 6/2013 | Franks | F01D 11/08 415/126 |
| 2013/0177384 A1 | 7/2013 | Coign et al. | |
| 2013/0177411 A1 | 7/2013 | Weber et al. | |
| 2014/0202168 A1 | 7/2014 | Shapiro et al. | |
| 2014/0260320 A1 | 9/2014 | Graves et al. | |
| 2014/0271144 A1* | 9/2014 | Landwehr | F01D 11/08 415/173.1 |
| 2015/0044044 A1 | 2/2015 | Sippel et al. | |
| 2016/0123171 A1 | 5/2016 | Westphal et al. | |
| 2016/0177786 A1 | 6/2016 | Sippel et al. | |
| 2016/0208635 A1 | 7/2016 | Vetters et al. | |
| 2016/0222812 A1 | 8/2016 | Sippel et al. | |

FOREIGN PATENT DOCUMENTS

| | | |
|---|---|---|
| EP | 2589774 A1 | 5/2013 |
| EP | 2604805 A2 | 6/2013 |
| FR | 2580033 A1 | 10/1986 |
| FR | 2980235 B1 | 4/2015 |
| GB | 2235730 A | 3/1991 |
| GB | 2468768 A | 9/2010 |
| GB | 2480766 A | 11/2011 |
| JP | 09250304 A | 9/1997 |
| JP | 09264104 A | 10/1997 |
| WO | 2010058137 A1 | 5/2010 |
| WO | 2011157956 A1 | 12/2011 |
| WO | 2014120334 A1 | 8/2014 |
| WO | 2014143225 A1 | 9/2014 |
| WO | 2014163674 A1 | 10/2014 |

OTHER PUBLICATIONS

Blosser, Max L.; Thermal Stress in High Temperature Cylindrical Fasteners; NASA Technical Memorandum; May 1988; pp. 1-12.
Blosser, Max L. and McWithey, Robert R.; Theoretical Basis for Design of Thermal-Stress-Free Fasteners; NASA Technical Paper; Dec. 1983; pp. 1-26.
Extended European Search Report, European Application No. 15200301.8, dated May 2, 2016, 6 pages.

* cited by examiner

TURBINE SHROUD

CROSS REFERENCE TO RELATED APPLICATIONS

This application claims priority to and the benefit of U.S. Provisional Patent Application No. 62/096,050, filed 23 Dec. 2014, the disclosure of which is now expressly incorporated herein by reference.

FIELD OF THE DISCLOSURE

The present disclosure relates generally to gas turbine engines, and more specifically to turbine shrouds used in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, a fan assembly. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Such static shrouds may be coupled to an engine case that surrounds the compressor, the combustor, and the turbine.

Some shrouds positioned in the turbine may be exposed to high temperatures from products of the combustion reaction in the combustor. Such shrouds sometimes include components made from materials that have different coefficients of thermal expansion. Due to the differing coefficients of thermal expansion, the components of some turbine shrouds expand at different rates when exposed to combustion products. For example, coupling such components with traditional fasteners such as rivets or bolts may not allow for the differing levels of expansion and contraction during operation of the gas turbine engine.

SUMMARY

The present application discloses one or more of the features recited in the appended claims and/or the following features which, alone or in any combination, may comprise patentable subject matter.

A turbine shroud for use in the turbine section of a gas turbine engine is disclosed in this paper. The turbine shroud may include an annular metallic carrier, a blade track, and a plurality of insert pins. The annular metallic carrier may be formed to include a plurality of apertures that extend in a radial direction through the annular metallic carrier. The blade track may include a ceramic annular runner and a plurality of pin receivers that extend inwardly in a radial direction from an outer radial surface toward an inner radial surface of the ceramic annular runner. The plurality of insert pins may each be arranged to extend through one of the plurality of apertures formed in the annular metallic carrier into a corresponding one of the plurality of pin receivers to locate the ceramic annular runner relative to the annular metallic carrier.

In some embodiments, the ceramic annular runner may include a forward section, an aft section spaced apart axially from the forward section, and a midsection extending between the forward section and the aft section. The pin receivers may be formed in the midsection of the ceramic annular runner.

In some embodiments, the plurality of pin receivers may be spaced apart from each other circumferentially around the ceramic annular runner. In some embodiments, the pin receivers may extend in a radial direction partway through the ceramic annular runner from the outer radial surface toward the inner radial surface.

In some embodiments, the turbine shroud may comprise at least three insert pins and the ceramic annular runner may comprise at least three corresponding pin receivers. In some embodiments, each of the pin receivers may include an axial dimension and a circumferential dimension. The axial dimension may be larger than the circumferential dimension.

In some embodiments, the ceramic annular runner may include a plurality of bosses that extend radially outward away from the outer radial surface. The bosses may be formed to include the pin receivers.

In some embodiments, the ceramic annular runner may include a forward section, an aft section spaced apart axially from the forward section, and a midsection extending between the forward section and the aft section. The plurality of bosses may be located in the midsection of the ceramic annular runner.

In some embodiments, the ceramic annular runner may consist essentially of ceramic matrix composite material. In some embodiments, the ceramic annular runner may consist essentially of silicon carbide matrix and silicon carbide fibers.

In some embodiments, the insert pin may comprise a metallic material. In some embodiments, the turbine shroud may further include a seal positioned radially between the annular metallic carrier and the ceramic annular runner.

According to another aspect of the disclosure, a turbine shroud may comprise a carrier adapted to be coupled to a turbine case, a blade track, and an insert pin. The blade track may include a ceramic annular runner and a pin receiver. The insert pin may be arranged to extend through the carrier into the pin receiver to block rotation of the ceramic annular runner relative to the carrier.

In some embodiments, the ceramic annular runner may include a forward section, an aft section spaced apart axially from the forward section, and a midsection extending between the forward section and the aft section. The pin receivers may be formed in the midsection of the ceramic annular runner.

In some embodiments, the ceramic annular runner may include an outer radial surface and an inner radial surface spaced apart radially from the outer radial surface. The pin receivers may extend in a radial direction partway through the ceramic annular runner from the outer radial surface toward the inner radial surface.

In some embodiments, the ceramic annular runner may consist essentially of ceramic matrix composite material. In some embodiments, the ceramic annular runner may consist essentially of silicon carbide matrix and silicon carbide fibers. In some embodiments, the insert pin may comprise a metallic material.

According to another aspect of the disclosure, a method of assembling a turbine shroud may comprise a number of steps. The method may include rotating an annular runner to a predetermined orientation relative to a carrier so that pin receivers formed in the annular runner are aligned with corresponding apertures formed in the carrier, nesting the annular runner into the carrier so that the annular runner is concentric with the carrier, and placing a plurality of insert pins into corresponding apertures and pin receivers to thereby establish a connection between the annular runner and the carrier.

In some embodiments, the annular runner may include a forward section, an aft section spaced apart axially from the forward section, and a midsection extending between the forward section and the aft section. The pin receivers may be formed in the midsection of the annular runner.

These and other features of the present disclosure will become more apparent from the following description of the illustrative embodiments.

DETAILED DESCRIPTION OF THE DRAWINGS

Figure 1:
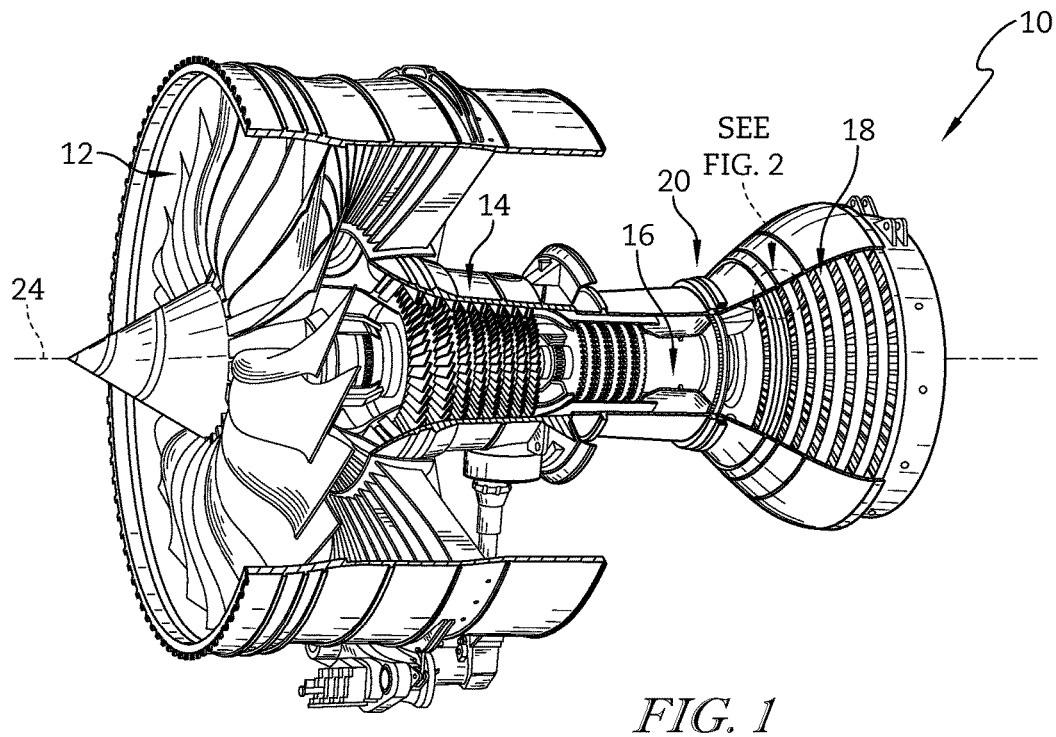
FIG. 1 is a cut-away perspective view of a gas turbine engine including a turbine section, the turbine section includes a rotating wheel assembly and a turbine shroud arranged around the rotating wheel assembly.

For the purposes of promoting an understanding of the principles of the disclosure, reference will now be made to a number of illustrative embodiments illustrated in the drawings and specific language will be used to describe the same.

FIG. 1 is an illustrative aerospace gas turbine engine 10 cut-away to show that the engine 10 includes a fan assembly 12, a compressor 14, a combustor 16, and a turbine 18. The illustrative aerospace gas turbine engine 10 is used in aircraft. The fan assembly 12 pushes air through the engine 10 to propel the aircraft. The compressor 14 compresses and delivers air to the combustor 16. The combustor 16 mixes fuel with the compressed air received from the compressor 14 and ignites the fuel. The hot, high pressure products of the combustion reaction in the combustor 16 are directed into the turbine 18 and the turbine 18 extracts work to drive the compressor 14 and the fan assembly 12.

Figure 2:
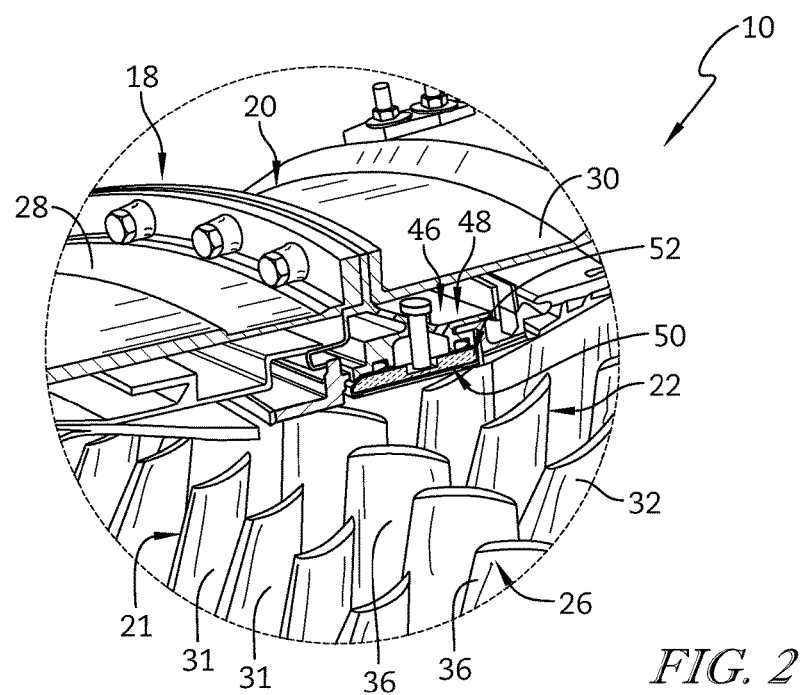
FIG. 2 is a detail view of FIG. 1 showing that the turbine shroud includes a carrier and a blade track positioned radially between the carrier and blades of the rotating wheel assembly to block combustion products from passing over the blades and further showing that the turbine shroud includes an annular runner and a plurality of insert pins that extend through the carrier and the annular runner to block rotation of the annular runner relative to the carrier.

The turbine 18 illustratively includes static turbine vane assemblies 21, 22, etc. and corresponding turbine wheel assemblies 26 etc. as shown in FIG. 2. Each vane assembly 21, 22, etc. includes a plurality of corresponding vanes 31, 32, etc. and each turbine wheel assembly 26 etc. includes a plurality of corresponding blades 36 etc. The vanes 31, 32, etc. of the vane assemblies 21, 22, etc. extend across the flow path of the hot, high-pressure combustion products from the combustor 16 to direct the combustion products toward the blades 36 etc. of the turbine wheel assemblies 26 etc. The blades 36 etc. are in turn pushed by the combustion products to cause the turbine wheel assemblies 26 etc. to rotate; thereby, driving the rotating components of the compressor 14 and the fan assembly 12.

The turbine 18 also includes a plurality of turbine shrouds 46 etc. that extend around each turbine wheel assembly 26 etc. to block combustion products from passing over the blades 36 without pushing the blades 36 to rotate. An exemplary first stage turbine shroud 46, shown in FIG. 2, extends around a first stage turbine wheel assembly 26 and is sized to block most combustion products from passing over the blades 36 without pushing the blades 36 to rotate. Combustion products that are allowed to pass over the blades 36 do not push the blades 36 and such passed-over products contribute to lost performance within the engine 10.

Figure 3:
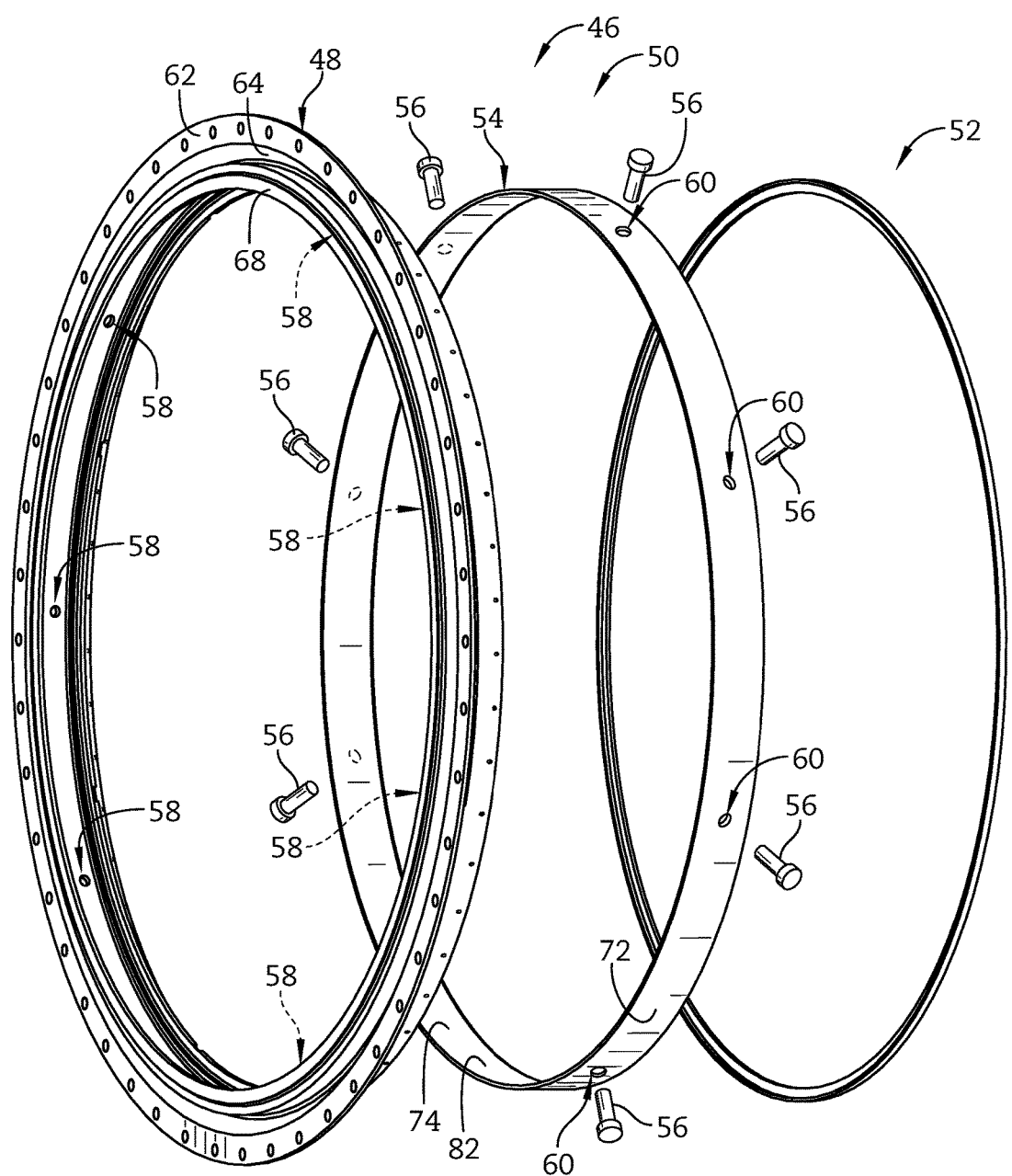
FIG. 3 is an exploded perspective view of the turbine shroud included in the gas turbine engine shown in FIGS. 1 and 2 showing that the turbine shroud includes the carrier formed to include a plurality of apertures, the blade track including the annular runner, the insert pins adapted to extend through the apertures into the annular runner, and a retainer adapted to axially position the blade track relative to the carrier.
Figure 4:
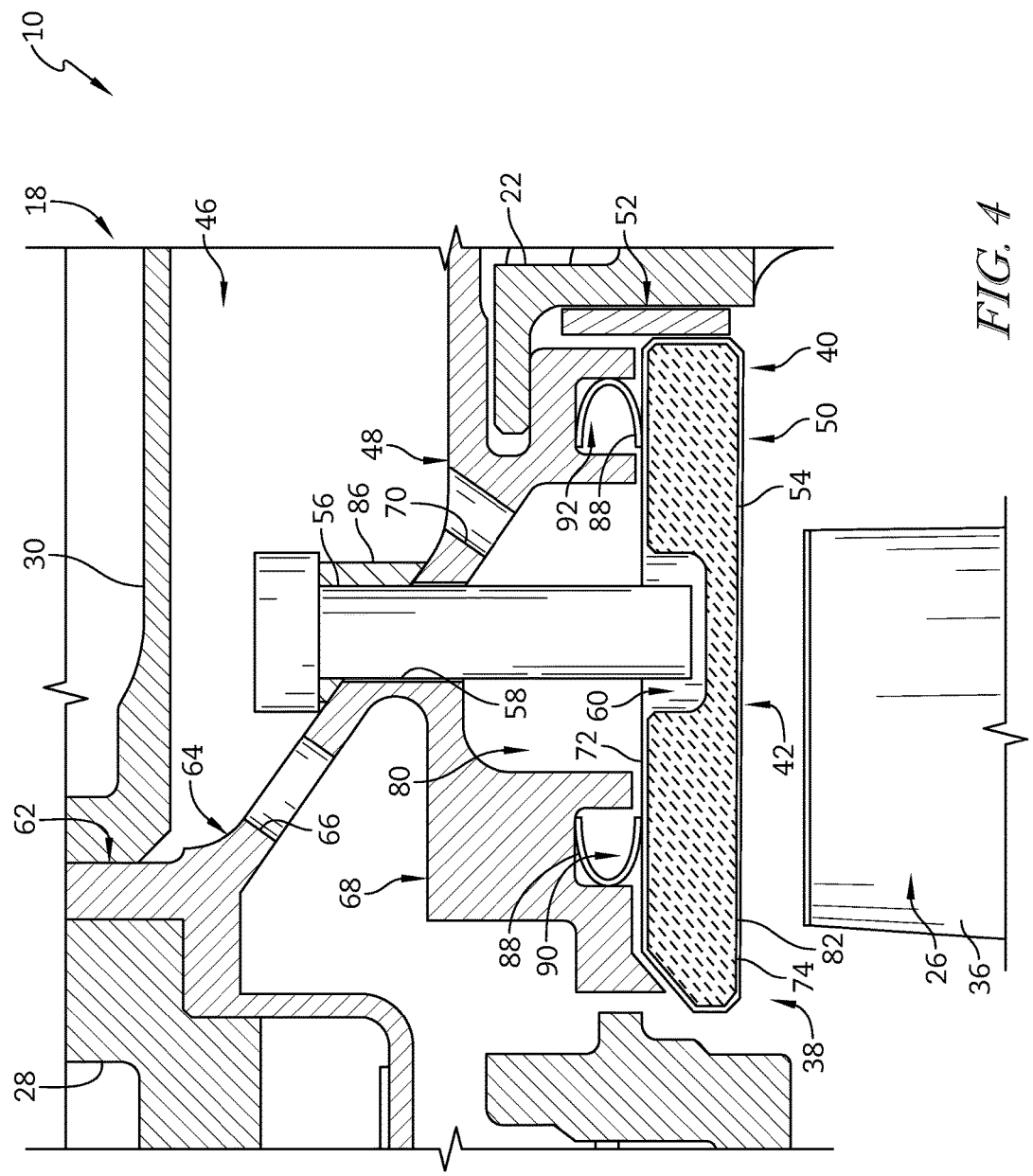
FIG. 4 is a partial cross-sectional view of the gas turbine engine of FIG. 1 showing that the insert pins extend through the carrier into pin receivers formed in the annular runner to block rotation of the carrier relative to the annular runner.

The turbine shroud 46 includes a central axis 24 and the turbine shroud 46 extends circumferentially about the central axis 24 as shown in FIGS. 1 and 2. The turbine shroud 46 illustratively includes a carrier 48, a blade track (sometimes called seal ring) 50, and a retainer 52 as shown in FIGS. 2-4. The carrier 48 is an annular, round metallic component and is configured to support the blade track 50 in position adjacent the blades 36 of the turbine wheel assembly 26. The illustrative blade track 50 is concentric with and nested into the carrier 48 along the central axis 24. The retainer 52 engages the carrier 48 to position the carrier 48 and the blade track 50 relative to other static turbine components.

In the illustrative embodiment, the turbine shroud 46 also includes a plurality of insert pins 56 as shown in FIGS. 2 and 3. The insert pins 56 extend through the carrier 48 and into the blade track 50 to located the blade track 50 relative to the carrier 48. More specifically, the insert pins 56 block rotation of the blade track 50 relative to the carrier 48 while allowing the blade track 50 and the carrier 48 to expand and contract at different rates when the turbine shroud 46 is heated and cooled during operation of the engine 10. Accordingly the carrier 48 and the blade tack 50 may be made from different materials that have different coefficients of thermal expansion.

While the carrier 48 is illustrated as an annular (full hoop) component, it may be made up of a number of segments in other embodiments. The carrier 48 is illustratively formed to include a connection flange 62, a connector 64, and a support band 68 as shown in FIGS. 3 and 4. The connection flange 62 is coupled with a case 20 of the gas turbine engine 10. In the illustrative embodiment, the connection flange 62 is bolted between a combustor-case section 28 and a turbine-case section 30 included in the case 20. The connector 64 extends inwardly in the radial direction and rearwardly in an axial direction from the connection flange 62 to form a frustoconical shape. The support band 68 extends inwardly in the radial direction from the connector 64 and the connection flange 62.

The support band 68 includes a forward side and an aft side spaced apart from the forward side along the central axis 24 as shown in FIG. 4. The support band 68 forms an inwardly-opening channel 80 positioned axially between the forward side and the aft side. The inwardly-opening channel 80 faces the blade track 50 as shown in FIG. 4. Illustratively, the inwardly-opening channel 80 is exposed to fluid communication with air radially outwardly of the blade track 50 via a vent hole pattern 70 formed in the support band 68 and a vent hole pattern 66 formed in the connector 64.

The connector 64 and the support band 68 are formed to include a plurality of apertures 58 as shown in FIGS. 3 and 4. The apertures 58 are spaced apart from one another circumferentially to form an aperture pattern around the circumference of the carrier 48. The apertures 58 extend through the connector 64 and the support band 68 in the radial direction and open into the inwardly-opening channel 80. Each aperture 58 is sized to receive an insert pin 56 that extends through the aperture 58 and the inwardly-opening channel 80 into the blade track 50 to block movement of the blade track 50 relative to the carrier 48. In some embodiments, the apertures 58 and insert pins 56 are threaded.

In the illustrative embodiment, the blade track 50 includes an annular runner 54 and a plurality of pin receivers 60 as shown in FIG. 3. The annular runner 54 illustratively forms a fully integrated hoop and is arranged to extend around the blades 36 to block combustion products from passing over the blades 36. The plurality of pin receivers 60 are spaced apart circumferentially and sized to receive the plurality of insert pins 56 as suggested in FIGS. 3-5. The plurality of insert pins 56 are coupled to the annular runner 54 by positioning each insert pin 56 in the corresponding aperture 58 formed in the carrier 48 and arranging each insert pin 56 in the corresponding pin receiver 60 formed in the annular runner 54 as shown in FIG. 4.

In the illustrative embodiment, the annular runner 54 comprises at least three insert pins 56 and at least three pin receivers 60. In the illustrative embodiment, the pin receivers 60 include chamfered surfaces 84 as shown in FIGS. 4 and 5.

In the illustrative embodiment, the insert pins 56 block rotation of the blade track 50 about the central axis 24 relative to the carrier 48. The insert pins 56 may also block axial movement of the blade track 50 along the central axis 24 relative to the carrier 48.

Figure 5:
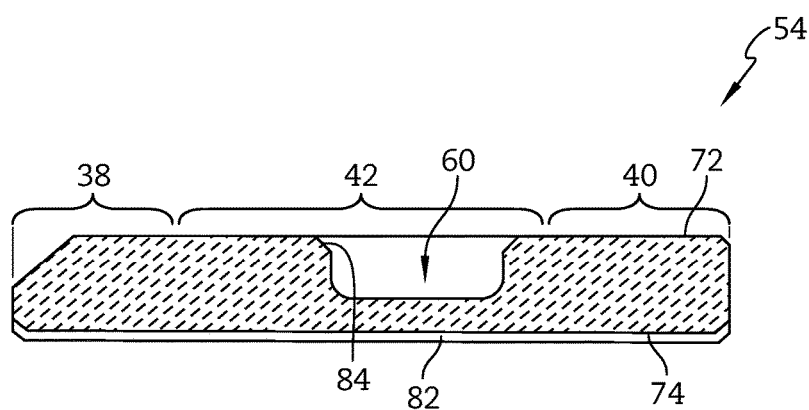
FIG. 5 is a detail perspective view of the annular runner included in the blade track of FIGS. 3 and 4 showing that the annular runner includes a forward section, an aft section, and a midsection extending therebetween and the pin receivers are formed in the midsection of the annular runner.

The annular runner 54 includes an outer radial surface 72 and an inner radial surface 74 positioned radially between the central axis 24 and the outer radial surface 72 as shown in FIG. 5. The illustrative pin receivers 60 extend in a radial direction partway through the annular runner 54 from the outer radial surface 72 toward the inner radial surface 74 of the annular runner 54. Illustratively, the outer radial surface 72 is substantially arcuate.

The annular runner 54 includes a forward section 38, an aft section 40 spaced apart axially from the forward section 38 relative to the central axis 24, and a midsection 42 positioned axially between the forward section 38 and the aft section 40 as shown in FIG. 5. In the illustrative embodiment, each of the sections 38, 40, 42 make up about one-third of the axial thickness of the annular runner 54. The forward section 38 is positioned toward the compressor 14 and the aft section 40 is positioned toward the turbine 18. The pin receivers 60 are formed in the midsection 42 as shown in FIG. 5. During use of the annular runner 54 in the engine 10, the midsection 42 is often in compression and the forward and aft sections 38, 40 are often in tension, when considering the hoop direction of the annular runner 54. Locating the pin receivers 60 in the midsection 42 of the annular runner 54 may reduce the peak mechanical stresses in the annular runner 54.

The location of the pin receivers 60 in the annular runner 54 influence the thermal stresses in the annular runner 54 produced around the pin receivers 60. In the illustrative embodiment, the blade track 50 is used in the turbine 18. The components such as, for example, the turbine shroud 46 in the turbine 18 experience high temperatures during operation. As a result, the turbine shroud 46 may be cooled with air to increase its useful life. Illustratively, high-pressure cooling air is supplied to the outer radial surface 72 of the blade track 50 to purge the inwardly-opening channel 80. As a result of the cooling air, the forward section 38 and the aft section 40 of the annular runner 54 are cooler than the midsection 42. In some embodiments, the pin receivers 60 are located midway circumferentially between fuel nozzles included in the turbine 18.

In some embodiments, the blade track 50 further includes an abradable layer 82 coupled to the inner radial surface 74. The abradable layer 82 may be thinner about the midsection 42 due to rubbing of the blades 36 against the abradable layer 82 about the midsection 42. As a result, the forward and aft sections 38, 40 may be cooler than the midsection 42 of the annular runner 54 due to the combustion products in the turbine 18 and the relatively thin region of the abradable layer 82.

Because the forward and aft sections 38, 40 are cooler than the midsection 42, the peak thermal stresses in the annular runner 54 are located at the forward and aft sections 38, 40. However, the peak mechanical stresses are located in the midsection 42 due to the pin receivers 60 being formed in the midsection 42. As a result, locating the pin receivers 60 in the midsection 42 separates the peak mechanical stresses from the peak thermal stresses of the annular runner 54.

In the illustrative embodiment, the insert pins 56 and the pin receivers 60 are circular when viewed looking radially inwardly toward the central axis 24. In other embodiments, each insert pin 56 and pin receiver 60 may be rectangular or may have another shape when viewed in the radial direction. When viewed in the radial or axial directions, sides of each insert pin 56 are perpendicular to the central axis 24.

In the illustrative embodiment, the pin receivers 60 have a larger diameter than a diameter of the insert pins 56. In other embodiments, the pin receivers 60 comprise slots. In some embodiments, the slotted pin receivers 60 have a larger axial dimension than a circumferential dimension relative to the central axis 24. In some embodiments, the slotted pin receivers 60 extend from the midsection 42 partway into one or both of the forward section 38 and the aft section 40.

In some embodiments, the turbine shroud 10 further includes washers 86 as shown in FIG. 4. The insert pins 56 extend through the washers 86 and the washers 86 engage the carrier 48 to support the insert pins 56. In other embodiments, the carrier 48 is formed to include bosses 86 in conjunction with or in place of the washers 86. The bosses 86 are integrally formed with the carrier 48 and extend outwardly radially away from the carrier 48. The insert pins 56 extend through the bosses 86 and the bosses 86 engage the carrier 48 to support the insert pins 56.

The annular runner 54 is illustratively made from a ceramic material; and, more particularly, a ceramic matrix composite (CMC) including silicon carbide fibers and silicon carbide matrix. For purposes of this application, a ceramic material is any monolithic ceramic or composite in which at least one constituent is a ceramic. In other embodiments, the annular runner 54 may be made of other metallic, non-metallic, or composite materials with low coefficients of thermal expansion.

In the illustrative embodiment, each insert pin 56 is made from a metallic material. In some embodiments, the insert pins 56 are made from a nickel-based alloy. In some embodiments, the insert pins 56 are made from a cobalt-based alloy.

In other embodiments, each insert pin 56 may be made from a ceramic material; and, more particularly, a ceramic matrix composite (CMC) including silicon carbide fibers and silicon carbide matrix. In some embodiments, each insert pin 56 may comprise a monolithic ceramic. In other embodiments, each insert pin 56 may be made from monolithic silicon carbide, dense chopped fiber reinforced silicon carbide, monolithic silicon nitride based materials, monolithic aluminum oxide, whisker reinforced aluminum oxide, and/or MAX phase materials (e.g. $Ti_3SlC_2$, $Ti_2AlC$, etc.).

In other embodiments, the insert pins 56 may comprise silicon-carbide reinforcements suspended in a silicon-carbide containing matrix material. In other embodiments, the insert pins 56 may comprise oxide-oxide reinforcements suspended in an oxide-oxide containing matrix material. In still other embodiments, each insert pin 56 may be made of other metallic, non-metallic, or composite materials with low coefficients of thermal expansion that are compatible with both the carrier 48 and the annular runner 54.

In some embodiments, the insert pins 56 may be bonded to the carrier 48 via brazing. In other embodiments, the insert pins 56 may be welded to the annular runner 54 creating a weld between the insert pins 56 and the annular runner 54. Filler materials may be used to form the welds and such filler materials may include silicon, a transition metal silicide, and/or a MAX phase material.

The annular runner 54 is illustratively a unitary component forming a full hoop as shown in FIG. 3. The annular runner 54 is a component of one-piece, continuous construction, rather than as a series of joined segments. This integral construction eliminates gaps that may be formed between parts of a multi-piece (or segmented) runner. The one-piece full hoop of the annular runner 54 encourages uniform radial expansion of the blade track 50 at high temperatures. Uniform radial expansion of the blade track 50 allows the blade track 50 to remain round at high temperatures which results in the ability to further maintain a small gap between the blades 36 and the blade track 50 while hot combustion products are being directed over the blades 36 and the blade track 50.

In the illustrative embodiment, the turbine shroud 46 further includes seals 88 as shown in FIG. 4. The seals 88 are positioned between the carrier 48 and the annular runner 54 to block combustion products from flowing over the outer radial surface 72 of the annular runner 54. The seals 88 are arranged to maintain contact with the annular runner 54 as the carrier 48 and annular runner 54 move radially due to thermal expansion. In some embodiments, the seals 88 are pre-loaded into a compressed state.

The carrier 48 is formed to include an inwardly-facing forward chamber 90 and an inwardly-facing aft chamber 92 as shown in FIG. 4. The forward chamber 90 is axially aligned with the forward section 38 of the annular runner 54 and receives a first seal 88. The aft chamber 92 is aligned with the aft section 40 of the annular runner 54 and receives a second seal 88. The annular runner 54 is located radially inward of the forward and aft chambers 90, 92 and engage the seals 88 to maintain the seals 88 in the chambers 90, 92. In the illustrative embodiment, seals 88 comprise C-shaped hoops as shown in FIG. 4.

The retainer 52 is an annular metallic ring with a linear cross section as shown in FIGS. 3 and 4. The retainer 52 engages the aft side of the support band 68 and the aft side of the blade track 50 to locate the carrier 48 and the blade track 50 relative to the second stage vane assembly 22 as shown in FIG. 3. In some embodiments, the retainer 52 may be a non-metallic or ceramic component with a coefficient of thermal expansion between about 1.0 in/in/F and about 4.0 in/in/F.

According to at least one method of assembling the turbine shroud 46, a user rotates the annular runner 54 to a predetermined orientation relative to the carrier 48 so that the pin receivers 60 are aligned with the corresponding apertures 58. Then the user nests the annular runner 54 into the carrier 48 so that the annular runner 54 is concentric with the carrier 48. Next, the user inserts the insert pins 56 of the blade track 50 into the corresponding apertures 58 formed in the carrier 48 and pin receivers 60 formed in the annular runner 54 to thereby establish a connection between the blade track 50 and the carrier 48.

Figure 6:
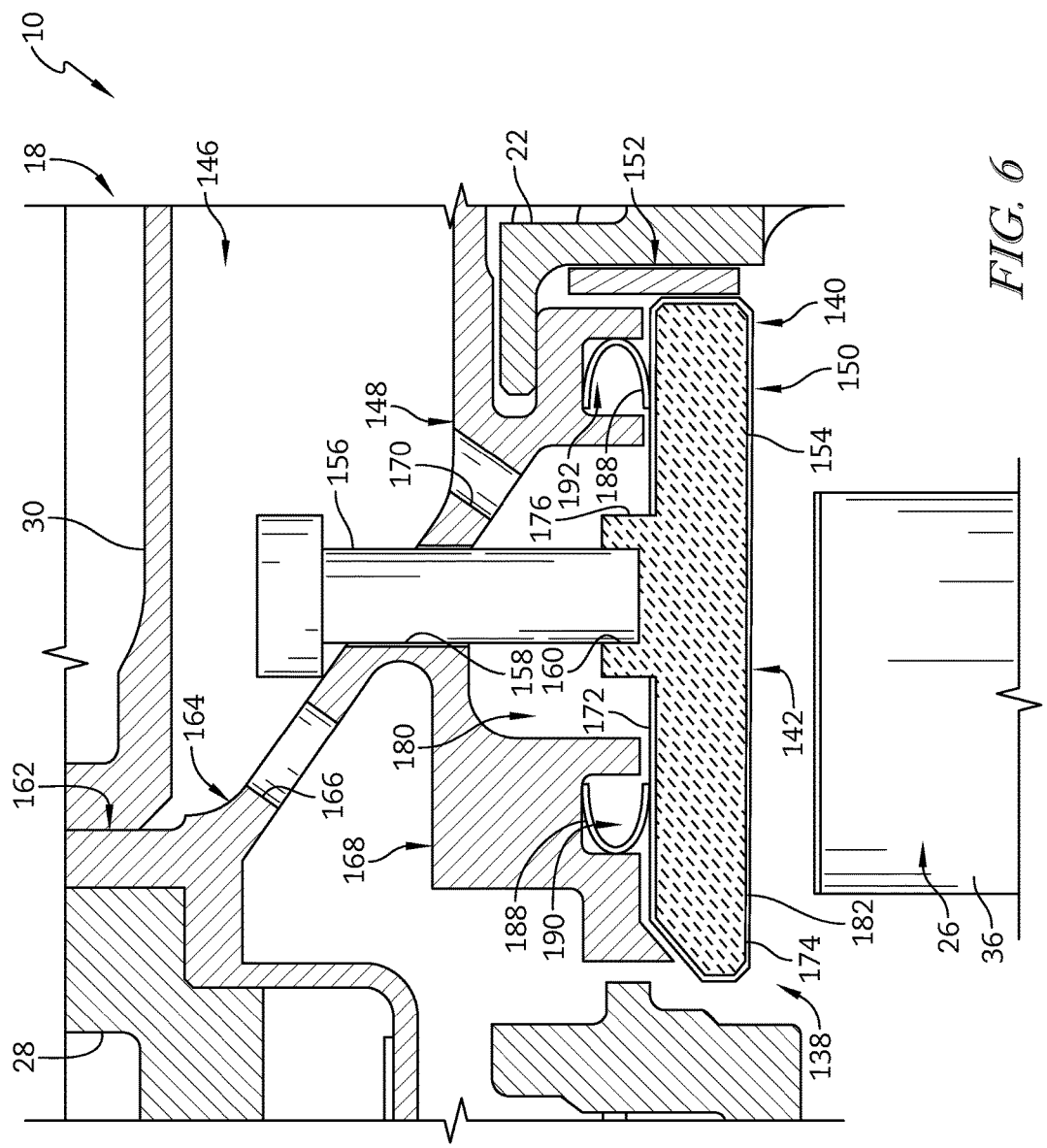
FIG. 6 is a partial cross-sectional view of another blade track adapted for use in the gas turbine engine of FIG. 1 and showing that the blade track an annular runner having bosses formed to include the pin receivers.

Another illustrative turbine shroud 146 is shown in FIG. 6. The turbine shroud 146 is configured for use in engine 10 and is substantially similar to the turbine shroud 46 shown in FIGS. 1-5 and described herein. Accordingly, similar reference numbers in the 100 series indicate features that are common between the turbine shroud 46 and the turbine shroud 146. The description of the engine 10 and the turbine shroud 46 is hereby incorporated by reference to apply to the turbine shroud 146, except in instances when it conflicts with the specific description and drawings of the turbine shroud 146.

The annular runner 154 includes a plurality of bosses 176 formed to include a corresponding pin receiver 160 as shown in FIG. 6. The bosses 176 extend outward radially away from the outer radial surface 172 of the annular runner 154 into the inwardly-opening channel 180. The bosses 176 are located in the midsection 142 of the annular runner 154.

In the illustrative embodiment, each pin receiver 160 extends inward radially partway through the boss 176 toward the outer radial surface 172. In other embodiments, each pin receiver 160 extends inward radially through the boss 176 beyond the outer radial surface 172 toward the inner radial surface 174.

Figure 7:
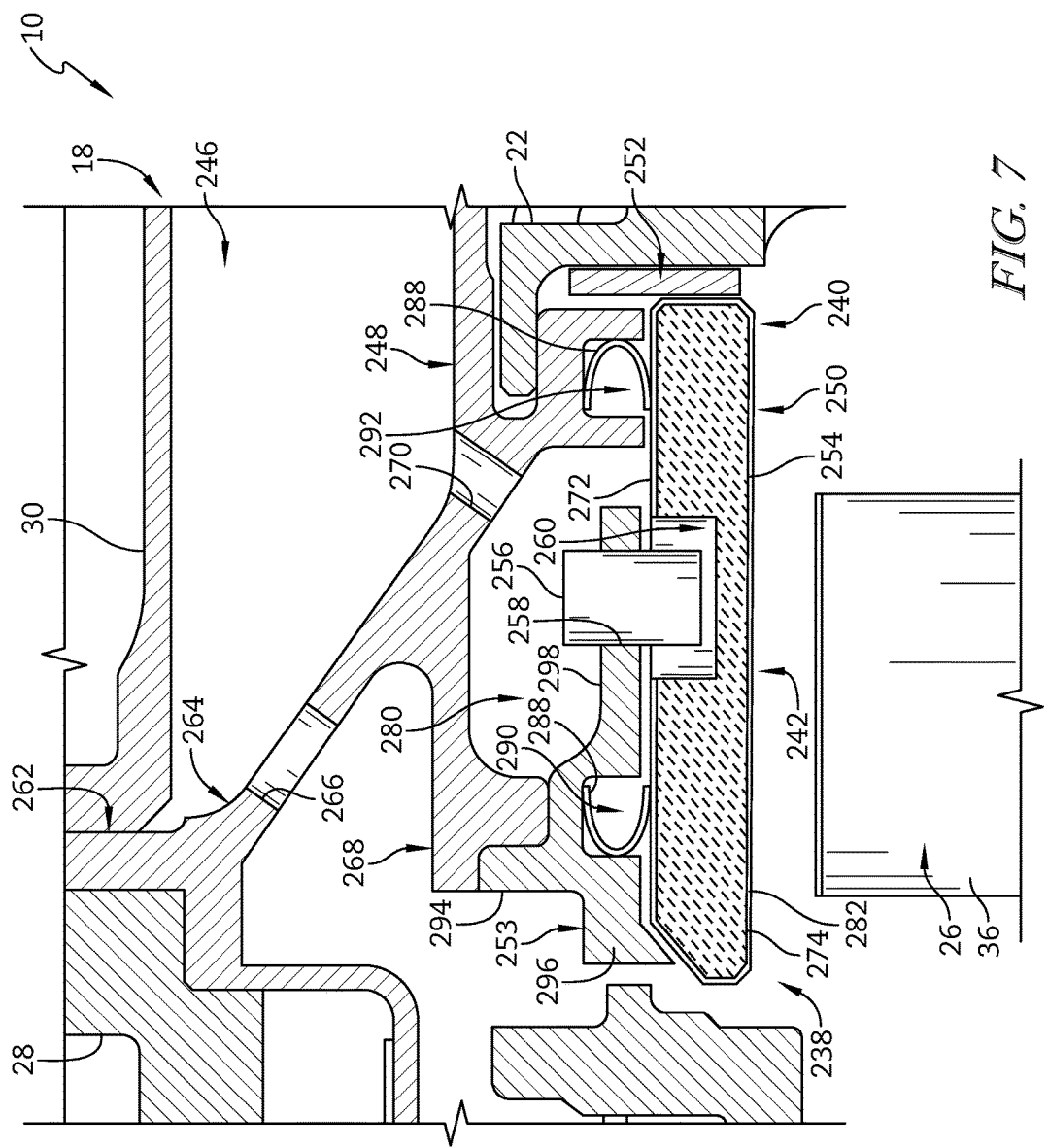
FIG. 7 is a partial cross-sectional view of another turbine shroud for use in the gas turbine engine of FIG. 1 and showing that the carrier further includes an intermediate support and the blade track and the insert pins extend through the intermediate support into the annular runner.

Another illustrative turbine shroud 246 is shown in FIG. 7. The turbine shroud 246 is configured for use in engine 10 and is substantially similar to the turbine shroud 46 shown in FIGS. 1-5 and described herein. Accordingly, similar reference numbers in the 200 series indicate features that are common between the turbine shroud 46 and the turbine shroud 246. The description of the engine 10 and the turbine shroud 46 is hereby incorporated by reference to apply to the turbine shroud 246, except in instances when it conflicts with the specific description and drawings of the turbine shroud 246.

The carrier 248 of the turbine shroud 246 further includes an intermediate support 253 as shown in FIG. 7. The intermediate support 253 is coupled with the support band 268 of the carrier 248 and is positioned radially between the support band 268 and the annular runner 254.

The intermediate support 253 includes a support flange 294, an intermediate band 296, and a support lip 298 as shown in FIG. 7. The support flange 294 extends radially outward away from the intermediate band 296 and is coupled with the support band 268. The intermediate band 296 is formed to include the inwardly-facing forward chamber 290 that receives a seal 288. The support lip 298 extends axially away from the intermediate band 296 toward the retainer 252. Illustratively, the support lip 298 is positioned in the inwardly-facing channel 280.

Unlike the turbine shroud 46, the intermediate support 253 is formed to include the plurality of apertures 258 and the apertures in the support band 268 are omitted as shown in FIG. 7. The apertures 258 are formed in the support lip 298. The insert pins 256 extend through the apertures 258 formed in the intermediate support 253 into the pin receivers 260 formed in the annular runner 254 to couple the intermediate support 253 with the annular runner 254. As a result, relative movement between the annular runner 254 and the intermediate support 253 and the carrier 248 is blocked.

In the illustrative embodiment, the insert pins 256 block rotation of the annular runner 254 about the central axis 224 relative to the carrier 248. The insert pins 256 may also block axial movement of the annular runner 254 along the central axis 224 relative to the carrier 248.

In the illustrative embodiment, the apertures 258 are spaced apart from the sidewalls of the intermediate support 253. In other embodiments, the apertures 258 comprise slots. In some embodiments, the slotted apertures 258 have a larger axial dimension than a circumferential dimension relative to the central axis 224. In other embodiments, the slotted apertures 258 have a larger circumferential dimension than the axial dimension relative to the central axis 224.

In some embodiments, the apertures 258 extend through the support lip 298 and open into an aft sidewall of the intermediate support 253. As such, the insert pins 256 may be positioned in the pin receivers 260. The intermediate support 253 may then be installed by translating the intermediate support 253 in the aft direction such that the slotted apertures 258 receive the insert pins 256.

In the illustrative embodiment, the intermediate support 253 is an annular hoop. In other embodiments, the intermediate support 253 comprises a plurality of segments that cooperate to form a segmented hoop. In some embodiments, the insert pins 256 are integrally formed with the intermediate support 253. In other embodiments, the insert pins 256 are bonded with the intermediate support 253 using a braze layer. In other embodiments, the insert pins 256 may be welded with the intermediate support 253.

According to at least one method of assembling the turbine shroud 246, a user rotates the annular runner 254 to a predetermined orientation relative to the intermediate support 253 so that the pin receivers 260 are aligned with the corresponding apertures 258. Then the user nests the annular runner 254 into the intermediate support 253 so that the annular runner 254 is concentric with the intermediate support 253 and engages the seal 288. Next, the user inserts the insert pins 256 into the corresponding apertures 258 formed in the intermediate support 253 and pin receivers 260 formed in the annular runner 254 to thereby establish a connection between the blade track 250 and the intermediate support 253 to block rotation of the blade track 250 relative to the intermediate support 253. In some embodiments, the insert pins 256 are coupled with the intermediate support 253. The annular runner 254 and intermediate support 253 are translated aft toward the turbine 18 and nested into the carrier 248. The intermediate support 253 is coupled with the carrier 248 to block rotation of the intermediate support 253 relative to the carrier 248.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud comprising
an annular metallic carrier formed to include a plurality of apertures that extend in a radial direction through the annular metallic carrier,
a solid blade track formed as a continuous full hoop and including a ceramic annular runner and a plurality of pin receivers that extend inwardly in a radial direction partway into the ceramic annular runner from an outer radial surface toward an inner radial surface of the ceramic annular runner, and
a plurality of insert pins each arranged to extend through one of the plurality of apertures formed in the annular metallic carrier into a corresponding one of the plurality of pin receivers to locate the ceramic annular runner relative to the annular metallic carrier.

2. The turbine shroud of claim 1, wherein the ceramic annular runner includes a forward section, an aft section spaced apart axially from the forward section, and a midsection extending between the forward section and the aft section and the pin receivers are formed in the midsection of the ceramic annular runner.

3. The turbine shroud of claim 1, wherein the plurality of pin receivers are spaced apart from each other circumferentially around the ceramic annular runner.

4. The turbine shroud of claim 1, wherein turbine shroud comprises at least three insert pins and the ceramic annular runner comprises at least three corresponding pin receivers.

5. The turbine shroud of claim 1, wherein each of the pin receivers includes an axial dimension and a circumferential dimension and the axial dimension is larger than the circumferential dimension.

6. The turbine shroud of claim 1, wherein the ceramic annular runner consists essentially of ceramic matrix composite material.

7. The turbine shroud of claim 1, wherein the ceramic annular runner consists essentially of silicon carbide matrix and silicon carbide fibers.

8. The turbine shroud of claim 1, wherein the insert pin comprises a metallic material.

9. The turbine shroud of claim 1, further comprising a seal positioned radially between the annular metallic carrier and the ceramic annular runner.

10. The turbine shroud of claim 1, wherein the outer radial surface of the ceramic annular runner is formed without radially extending protrusions.

11. The turbine shroud of claim 2, wherein the outer radial surface defines at least a portion of the forward section, midsection, and aft section.

12. A turbine shroud comprising
a carrier adapted to be coupled to a turbine case,
a solid blade track including a ceramic full-hoop, annular runner and a cylindrical boss that extends radially outward away from the ceramic full-hoop, annular runner and the cylindrical boss formed to include a pin receiver that extends radially inward into the cylindrical boss, and
an insert pin arranged to extend through the carrier into the pin receiver to block rotation of the ceramic annular runner relative to the carrier.

13. The turbine shroud of claim 12, wherein the ceramic annular runner includes a forward section, an aft section spaced apart axially from the forward section, and a midsection extending between the forward section and the aft section and the cylindrical boss is formed in the midsection of the ceramic annular runner.

14. The turbine shroud of claim 12, wherein the ceramic annular runner consists essentially of ceramic matrix composite material.

15. The turbine shroud of claim 12, wherein the ceramic annular runner consists essentially of silicon carbide matrix and silicon carbide fibers.

16. The turbine shroud of claim 12, wherein the insert pin comprises a metallic material.

17. A method of assembling a turbine shroud, the method comprising the steps of
providing a carrier formed to include a plurality of apertures that extend in a radial direction through the carrier, a solid annular runner comprising ceramic matrix composite materials and formed to include pin receivers that extend inwardly in a radial direction partway into the solid ceramic annular runner from an outer radial surface toward an inner radial surface of the solid ceramic annular runner, and a plurality of insert pins,
rotating the solid annular runner to a predetermined orientation relative to the carrier so that the pin receivers formed in the solid annular runner are aligned with the plurality of apertures formed in the carrier,
nesting the solid annular runner into the carrier so that the solid annular runner is concentric with the carrier, and
placing the plurality of insert pins into corresponding apertures and pin receivers to thereby establish a connection between the solid annular runner and the carrier.

18. The method of claim 17, wherein the solid annular runner includes a forward section, an aft section spaced apart axially from the forward section, and a midsection extending between the forward section and the aft section and the pin receivers are formed in the midsection of the solid annular runner.

19. The method of claim 17, wherein the outer radial surface of the solid ceramic annular runner is formed without radially extending protrusions.

20. The method of claim 18, wherein the outer radial surface defines at least a portion of the forward section, midsection, and aft section.

* * * * *